United States Patent

Popp et al.

Patent Number: 6,157,883
Date of Patent: Dec. 5, 2000

[54] INCREASING THE SPONTANEITY OF AN AUTOMATIC GEAR BOX

[75] Inventors: Christian Popp, Kressbronn; Friedrich Tenbrock, Langenargen; Hansjörg Rosi, Meckenbeuren, all of Germany

[73] Assignee: ZF Friedrichshafen AG, Friedrichshaften, Germany

[21] Appl. No.: 09/297,786

[22] PCT Filed: Nov. 15, 1997

[86] PCT No.: PCT/EP97/06386

§ 371 Date: May 6, 1999

§ 102(e) Date: May 6, 1999

[87] PCT Pub. No.: WO98/23884

PCT Pub. Date: Jun. 4, 1998

[30] Foreign Application Priority Data

Nov. 22, 1996 [DE] Germany .................. 196 48 383

[51] Int. Cl.$^7$ ............................ F16H 61/06; F16H 61/08
[52] U.S. Cl. ...................... 701/51; 477/34; 477/70
[58] Field of Search .................. 701/51, 64, 65, 701/66, 67, 68; 192/3.51, 3.3; 477/34, 70, 72, 74, 79

[56] References Cited

U.S. PATENT DOCUMENTS

| | | | |
|---|---|---|---|
| 4,942,530 | 7/1990 | Boda et al. ........................ | 701/66 |
| 4,955,257 | 9/1990 | Terayama et al. ................. | 477/154 |
| 5,079,970 | 1/1992 | Butts et al. ........................ | 74/858 |
| 5,363,724 | 11/1994 | Asahara et al. .................. | 477/143 |
| 5,376,056 | 12/1994 | Wakahara et al. ............... | 475/123 |
| 5,460,583 | 10/1995 | Kitada et al. .................... | 477/154 |
| 5,558,597 | 9/1996 | Oba et al. ........................ | 477/98 |
| 5,609,068 | 3/1997 | Gruhle et al. .................... | 74/336 R |
| 5,771,477 | 6/1998 | Showalter et al. ............... | 701/51 |
| 5,848,370 | 12/1998 | Kozaki et al. .................... | 701/51 |

FOREIGN PATENT DOCUMENTS

| | | |
|---|---|---|
| 0 435 375 A2 | 7/1991 | European Pat. Off. . |
| 43 11 886 A1 | 10/1994 | Germany . |
| 44 24 456 A1 | 1/1996 | Germany . |

*Primary Examiner*—Michael J. Zanelli
*Assistant Examiner*—Eric M. Gibson
*Attorney, Agent, or Firm*—Davis and Bujold

[57] ABSTRACT

For an electro-hydraulically controlled automatic transmission (2) in which shifts are performed by overlapping, a method is proposed for increasing the spontaneity, in which a variable hold time is introduced for a disengaging clutch. This variable hold time is a function of the rotational speed differential of a transmission input speed (nT) and the temperature of the hydraulic fluid (Θ).

10 Claims, 4 Drawing Sheets

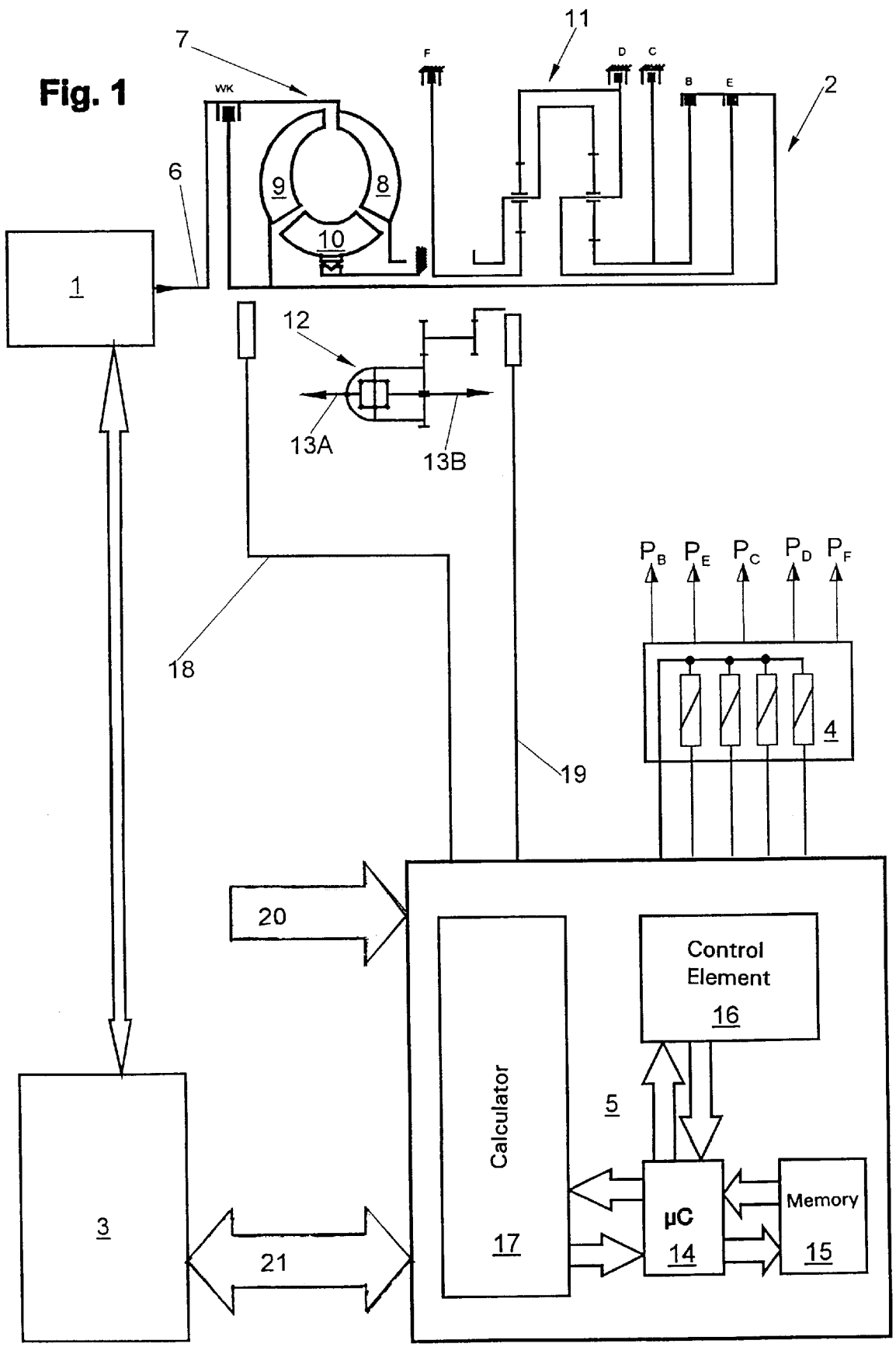

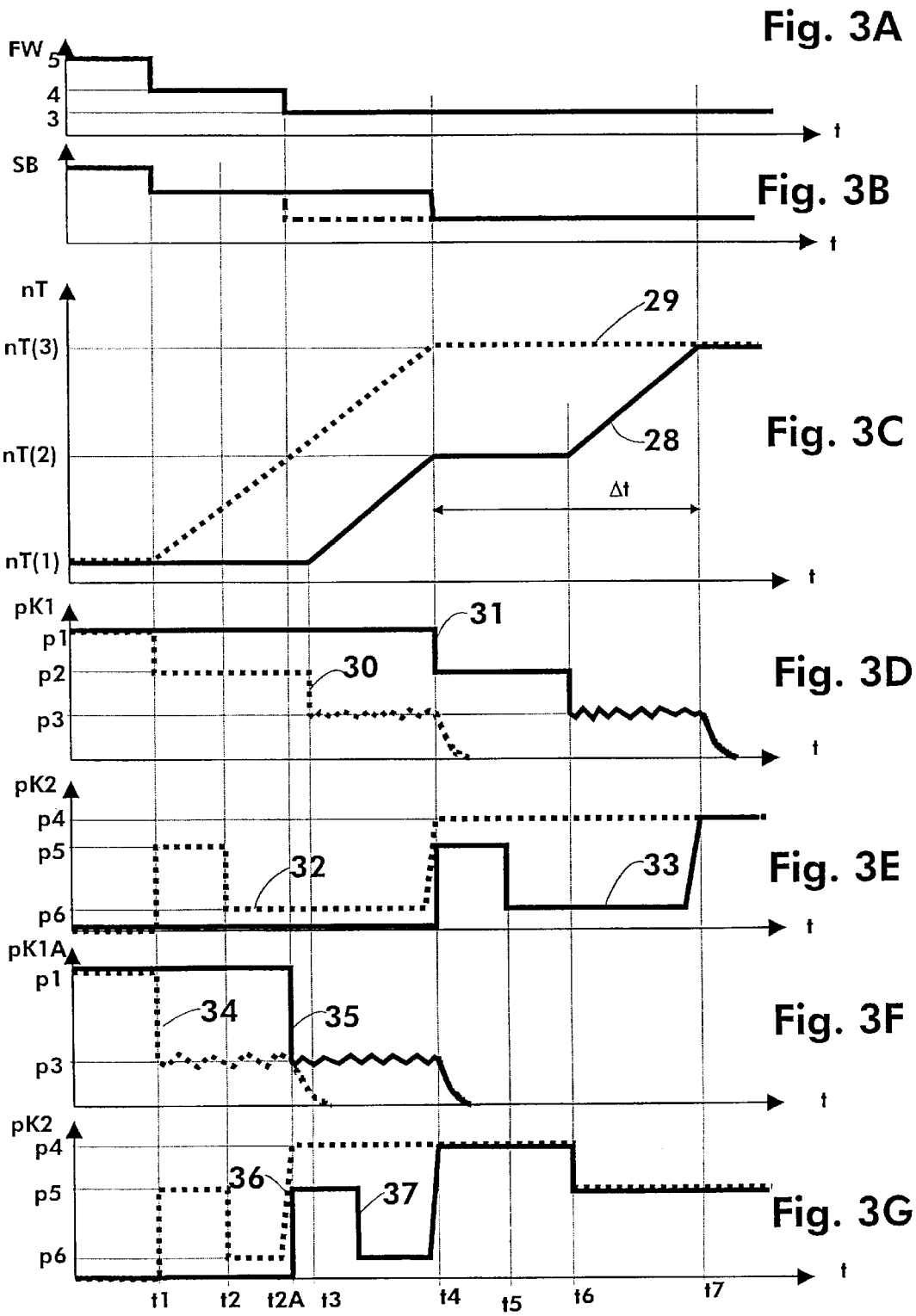

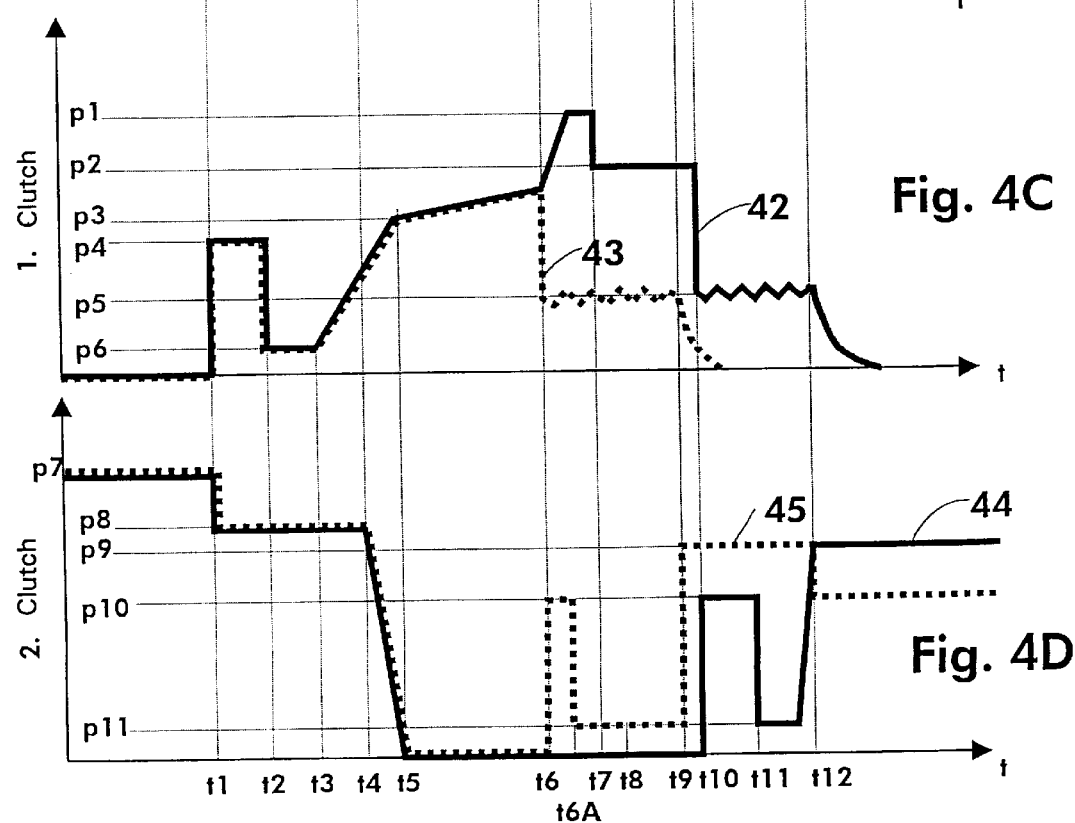

INCREASING THE SPONTANEITY OF AN AUTOMATIC GEAR BOX

This invention concerns a method for increasing the spontaneity of an electrohydraulically controlled automatic transmission in which a gearshift from a first reduction step to a second reduction step in a downshift is effected by a first clutch opening and a second clutch closing.

BACKGROUND OF THE INVENTION

In automatic transmissions, gearshifts are usually overlapping gearshifts, that is, a first clutch opens and a second clutch closes. Thus, U.S. Pat. No. 5,079,970, for example, proposes an overlapping gearshift for a downshift wherein, at the beginning of the shift, the pressure level applied to the first clutch is reduced to a lower pressure level according to a ramp function. This is followed by a time function during which the transmission input speed increases. The pressure curve of the second engaging clutch, consists of rapid filling, filling equalization and a load take-up phase. Downshifts are usually produced when an presettable accelerator pedal value exceeds a downshift characteristic line. Together with downshifts produced by means of the accelerator pedal, the driver also has the possibility of producing manual downshifts whenever desired. DE-OS 43 11 886, for example, shows a device by which with the aid of a selector lever the driver can produce gearshifts with a manual gate or shifting rocker on a steering wheel. For manually produced downshifts, for example, there arises, in practice, a problem of long reaction times, that is, the time interval, from the manual demanded downshift, until a noticeable reaction of the automatic transmission appears. Long reaction times result from the idle times of the signals controlling the hydraulic system, blocking times between two consecutive gearshifts and the time needed for the disengagement of the first clutch or filling of the second clutch. The long reaction times are felt as unpleasant by the driver.

The invention is based on the problem of improving the spontaneity of the automatic transmission, specially in a downshift and a double shift included therein.

SUMMARY OF THE INVENTION

According to the invention, the problem is solved by reducing, with the issuance of the shift command, the pressure level of the first clutch from a first pressure level to a second pressure level and maintaining the second pressure level during a hold time, this being a function of a rotational speed differential of a transmission input speed and the temperature of the hydraulic fluid. With the termination of the hold time, the pressure level of the first clutch is reduced to a third pressure level for a recovery time. This third pressure level determines the recovery time curve of the transmission as the pressure level of the first clutch is reduced to zero. The solution, according to the invention, offers the advantage of a variable hold time. The reaction time is determined by said hold time. Preferably, the hold time is patterned in such a manner that a small speed jump of the transmission input speed a long hold time is provided and in a large jump of the transmission input speed a very short hold time is spent.

Preferably, the speed jump of the transmission input speed is calculated from the transmission input speed at the beginning of the gearshift in the first reduction step and the value of the transmission input speed at the synchronization point of the second reduction step.

For applying the method to sequentially performed double shifts, it is further proposed, according to the invention, that in double shifts comprising a first shift and a second shift, the second shift corresponds to a downshift, the change for the second shift as described above.

In a development of this, it is proposed that in a double shift in which the first shift corresponds to an upshift from a first to a second reduction step, a time step be started with disengagement of the first clutch. Said time step extending up to a maximum time wherein a reduction time is associated with each value of the time step. The reduction time in that case determines a rapid filling time of the engaging clutch in the downshift. This solution offers the advantage that blocking periods between the upshift and the downshift are eliminated. Said blocking periods were needed, because the disengaging clutch in the upshift is filled again in the downshift that follows so that a reliable draining had to be previously guaranteed.

BRIEF DESCRIPTION OF THE DRAWINGS

One embodiment is illustrated in the drawings which show:

FIG. 1 is a system table of an automatic transmission;

FIGS. 3A–3G and FIGS. 4A–4D are time diagrams for a double shift.

DESCRIPTION OF THE PREFERRED EMBODIMENTS

Figure 2A:
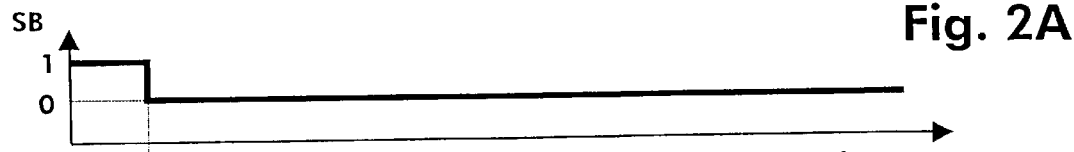
FIGS. 2A–2D are time diagrams for a downshift.

FIG. 1 shows a system table of an automatic transmission. The automatic transmission 2 consists of one hydrodynamic converter 7, a composite planetary transmission 11 with differential 12, a hydraulic control device 4 and an electronic transmission control 5. An internal combustion engine 1 drives the automatic transmission 2 via an input shaft 6. An electronic engine control device 3 controls or regulates the internal combustion engine 1. The input shaft 6 is non-rotatably connected with the hydrodynamic converter 7 and drives the impeller 8 thereof. As already known, the hydrodynamic converter 7 comprises the impeller 8, a turbine wheel 9 and a stator 10. Parallel to the hydrodynamic converter 7 is shown without reference numeral a converter lock-up clutch. When the converter lock-up clutch is actuated, the turbine shaft rotates at the same speed as the input shaft 6. The composite planetary transmission 11 consists of two pairs of planet gears and the clutches and brakes B to F. The output takes place via the differential 12 and the two axle half shafts 13A and 13B. Since the mechanical part is not relevant for better understanding of the invention, a detailed description is omitted. The clutches and brakes B to F are controlled or regulated by the electronic transmission control 5 via the hydraulic control device 4. The shifts, that is, the upshifts and downshifts of the automatic transmission 2, are effected as overlapping shifts in which a first clutch opens and a second clutch closes. In the hydraulic control device 4 are placed electromagnetic actuators and hydraulic shift valves. Of the electronic control device 5, there are shown, in extensively simplified form, the function blocks of a micro-controller 14, memory 15, function block control elements 16 and function block calculator 17. The memory 15 is usually designed as an EPROM, EEPROM, or as buffered RAM. In the memory 15 are deposited the data relevant to the transmission. The function block control element 16 serves to control the electromagnetic control elements in the hydraulic control device 4. The function block calculator 17 serves to calculate the data relevant to the shift. These are determined from the input parameters 18 to 21. Input parameters 20 are, for example, the signal of a selector lever, the signal of tipping keys, the speed of the internal combustion engine, the signal of the position of an accelerator pedal or throttle valve, the temperature of the hydraulic fluid, etc. The electronic motor control device 3 and the electronic control device 5 are interconnected by a data line 21. Said data line 21 can be designed as an unidirectional wire intersection point, for example, to carry out a motor gearing. The data line 21 can also be designed as bi-directional data line for a bus system such as CAN bus. Added input parameters for the control device 5 are the transmission input speed 18, that is, the speed of the turbines shaft, and the transmission output speed 19.

Figure 2B:
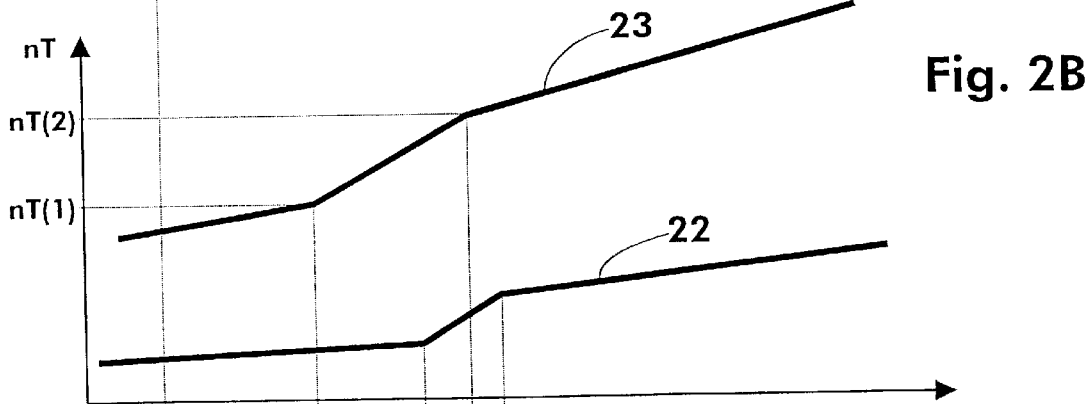
Figure 2C:
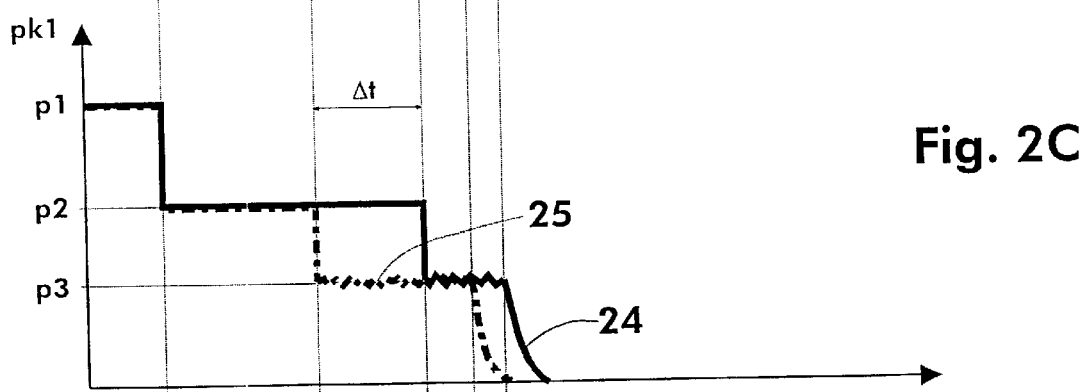
Figure 2D:
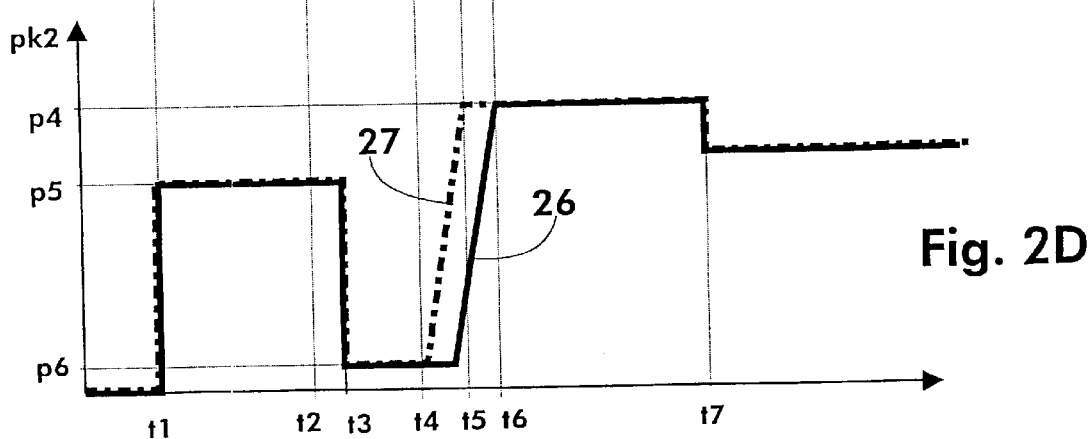

FIG. 2 consists of the parts FIGS. 2A to 2D. A shift from a first to a second reduction step to downshift is shown. The figures respectively show in the course of time: FIG. 2A a state diagram of the shift command, FIG. 2B a speed curve nT of the transmission input speed, FIG. 2C a pressure curve pK1 of a first, the disengaging, clutch and FIG. 2D the pressure curve pK2 of a second, the engaging, clutch. Two examples are shown in FIGS. 2B, 2C and 2D. FIG. 2B shows, with reference numeral 22, a downshift beginning at low speed level. To said first example belongs in FIG. 2C, with reference numeral 24, the pressure curve pK1 of the first clutch and in FIG. 2D, with reference numeral 26, the pressure curve pK2 of the second clutch. To the second example in FIG. 2B, with reference numeral 23, belongs in FIG. 2C the pressure curve pK1 of the first clutch, with reference numeral 25, and in FIG. 2D the pressure curve pK2 of the second clutch, with reference numeral 27.

FIRST EXAMPLE

At the moment t1, a shift command is issued, that is, in FIG. 2A the state of the signal changes from one to zero. With issuance of the shift command, the pressure level pK1 of the first clutch changes from a first pressure level p1 toward a pressure level p2. Also at the moment t1, the second clutch is loaded with a high pressure level p5, the rapid filling pressure. This terminates at the moment t3. Thereafter the second clutch is charged with filling pressure p6. At the moment t4 terminates a hold time of the first clutch which begins at the moment t1. After termination of the hold time at the moment t4, the pressure level pK1 of the first clutch is reduced from the second pressure level p2 to a third pressure level p3. Hereby changes the curve of the input speed nT. At the moment t6, the transmission input speed nT has reached the synchronization point. At the synchronization point, the second clutch takes over the load from the first clutch, that is, the pressure level of the first clutch is reduced to zero while the pressure level of the second clutch is raised from the filling pressure to the value p4. At the moment t7, the shift is terminated, that is, the pressure level pK2 of the second clutch goes to a pressure level following the shift.

SECOND EXAMPLE

At the moment t1, the shift command is issued, the signal changes in FIG. 2A from one to zero. The pressure level of the first clutch pK1 simultaneously is reduced from a first level p1 to a second level p2. Also at the moment t1, the second clutch is loaded with the rapid filling pressure p5. The rapid filling pressure is maintained up to the moment t3, then the second clutch is charged with filling pressure. At the moment t2, the hold time of the first clutch has expired. With the end of the hold time, the pressure level pK1 of the first clutch is passed from the second pressure level p2 to a third pressure level p3. As consequence of this the curve of the transmission input speed nT of FIG. 2B changes. At the moment t5 is reached the synchronous speed of the new gear. In FIG. 2B said synchronous speed value is designated as nT(2) on the ordinate. At the synchronization point the second clutch takes over the load from the first clutch. The pressure level pK1 of the first clutch is thus reduced to zero while the pressure level of the second clutch pK2 is raised to the pressure level p4. At the moment t7, the pressure level pK2 of the second clutch changes to a pressure level following the shift.

In the first example, the hold time lasts from t1 to t4. In the second example, the hold time lasts from t1 to t2. Said hold time is variably realized. Input parameters of said hold time are a rotational speed differential $d\_nT$ of the transmission input speed nT and a temperature of the hydraulic fluid $\Theta$ so that $tHALT=f(d\_nT, \Theta)$ applies. The rotational speed differential $d\_nT$ results from the difference of the transmission input speed in the first and second synchronization points. For the second example thus results the rotational speed differential: $d\_nT=nT(2)-nT(1)$.

In a simpler embodiment, the hold time can also be alternatively determined depending only on the transmission input speed in the first synchronization point nT(1) or in the second synchronization point nT(2). Thus applies:

$$tHALT=f(nT(1), \Theta)$$

or $$tHALT=f(nT(2), \Theta).$$

As shown in FIG. 2, there thus results for the Example 2 compared to Example 1 a time advantage of $\Delta t$. The effect of this time advantage is that a driver, after having induced a downshift, perceives more quickly a reaction of the automatic transmission; in other words: he feels more spontaneously the behavior of the automatic transmission.

FIG. 3 shows an application to a double shift of the method described in FIG. 2. Said double shift consists of a first and second sequentially performed shifts. Both the first and the second shifts are downshifts, that is, for a ex., a double shift from the fifth to the third gear. FIG. 3 consists of the parts FIG. 3A to 3G. They respectively show in the course of time:

FIG. 3A the driver's desired performance FW;

FIG. 3B the shift command SB;

FIG. 3C the curve of the transmission input speed nT in two examples (reference numerals 28, 29);

FIG. 3D the pressure curve pK1 of the two first, that is, disengaging, clutches for the first example:

FIG. 3E the pressure curve pK2 of the two second, that is, engaging, clutches for the first example;

FIG. 3F the pressure curve pK1A for both first clutches of the second example; and FIG. 3G the pressure curve pK2A for both first clutches of the second example.

FIG. 3C shows, with reference numeral 28, a first example of a double shift according to the prior art. The pressure curves of FIGS. 3D and 3E belong to said speed curve nT. As detected, a total of four clutches take part in this double downshift. A second example is shown in FIG. 3C, with reference numeral 29. This example corresponds to the solution according to the invention. The pressure curves of FIGS. 3F and FIG. 3G belong to the speed curve nT according to reference numeral 29.

FIRST EXAMPLE

At the moment t1, a driver issues a wish for a first downshift. Thereby the signal curve changes in FIGS. 3A and 3B. The pressure level pK1 of the first clutch of the first downshift, reference numeral 30, is simultaneously reduced to the second pressure level p2. The latter is maintained during the hold time, that is, the time interval t1 to t3. Also at the moment t1, the second clutch, reference numeral 32, is loaded with the rapid filling pressure p5. The rapid filling pressure lasts up to the moment t2. Thereafter the second clutch is filled with the filling pressure p6. At the moment t3, the hold time has expired, that is, the pressure level pK1 of the first clutch is reduced from the second pressure level p2 to the third pressure level p3. Thereby changes the curve of the transmission input speed nT from nT(1) in direction to nT(2). The gradient of the transmission input speed can be determined by the pressure level p3 of the first clutch. At the moment t4, the synchronous speed value nT(2) is reached. At the synchronization point, the pressure level pK2 of the second clutch has reached the pressure level p4. Since the second clutch has now taken over the load from the first clutch, the pressure level p3 of the first clutch is reduced to zero. It is now assumed that in the time interval t2 to t4 the driver has brought about a second downshift. This is shown in FIG. 3A by the signal level of the driver's wish FW changing from "4" to "3". At the moment t4, with the detection of the synchronization point nT(2), a new shift command is thus issued, as can be seen in FIG. 3B. Also at the moment t4, the pressure level pK1 of the second disengaging clutch is reduced from the pressure level p1 to the pressure level p2. The pressure level pK2 of the second engaging clutch is simultaneously brought to the rapid filling pressure level p5 for the during t4 to t5. Thereafter the second engaging clutch is filled with the filling pressure p6. The hold time of the first clutch, reference numeral 31, runs during the time interval t4 to t6. During this hold time, the curve of the transmission input speed nT does not change, that is, the speed remains static during the speed value nT(2). At the moment t6, the hold time has expired, that is, the pressure level pK1 of the first clutch is reduced from the second pressure level p2 to the third pressure level p3. Hereby the curve of the transmission input speed nT change from the value nT(2) in direction to nT(3). At the moment t7 is reached, the synchronization point, speed value nT(3) in FIG. 3C. At the synchronization point, the second engaging clutch, according to FIG. 3E, takes over the load from the first clutch. The first clutch is simultaneously passed from the third pressure level p3 to zero.

SECOND EXAMPLE

The second example shows the solution according to the invention. The second example comprises in FIG. 3C, in the speed curve of the transmission input speed nT, according to reference numeral 29, the pressure curves of the two disengaging clutches, reference numerals 34 and 35 in FIG. 3F and the pressure curves of the two engaging clutches, reference numerals 36 and 37 in FIG. 3G. At the moment t1, a driver initiates a downshift, for ex., from the fifth to the fourth gear, as shown in FIG. 3A. Thereby a shift command is issued, see FIG. 3B. At the moment t1, the pressure level pK1A of the first disengaging clutch, reference numeral 34, is reduced from the first pressure level p1 to the third pressure level p3. In the instant example, it has thus been assumed that the hold time has been calculated as zero. The hold time is a function of the rotational speed differential of the transmission input speed d_nT and of the temperature Θ of the hydraulic medium. The difference of the two synchronization points nT(2) and nT(1). As soon as the pressure level pK1A of the first disengaging clutch has reached the third pressure level p3, the gradient of the transmission input speed nT changes in direction to the speed value nT(2). The pressure value p3 is maintained up to the moment t2A. The curve of the transmission input speed is determined by the pressure level p3. Also at the moment t1, the first engaging clutch, reference numeral 36, is loaded with rapid filling pressure, pressure level p5, up to the moment t2. Thereafter said clutch is filled with the filling pressure p6. At the moment t2A, the synchronous speed nT(2) is reached. At this point, the first engaging clutch takes over the load from the first disengaging clutch. The pressure level of the first disengaging clutch is reduced from the third pressure level p3 to zero. Simultaneously with the detection of the synchronous speed nT(2), the second disengaging clutch, reference numeral 35, is reduced from the first pressure level p1 to the third pressure level p3. The hold time is here eliminated, since it has been calculated as zero. Thereafter follows with pressure level p3 the control phase during which the curve of the transmission input speed changes in direction nT(3). Also at the moment t2A, the second engaging clutch, reference numeral 37, is loaded with rapid filling pressure followed by filling pressure p6. At the moment t4, the second synchronization point nT(3) is reached. At said synchronous speed value the second engaging clutch takes over the load from the second disengaging clutch. The second disengaging clutch is reduced from the third pressure level p3 to zero. As it can be seen from FIGS. 3A and 3B, as result of the driver's demand for one other downshift, moment t2A, the shift command is immediately issued. As shown in FIG. 3C, there thus results for both examples a time offset Δt from the moment t4 up to the moment t7; in other words: compared to the speed curve, according to the prior art, reference numeral 28, the application of the method of the invention results in the speed curve according to reference numeral 29. Between the driver's demand for a double downshift and the reaching of the synchronous speed value nT(3), a short time thus elapses according to the curve reference numeral 29, that is, the reaction time was clearly shortened; the driver perceives a spontaneous reaction.

In FIG. 4 is shown a double shift comprising an upshift and a downshift that follows it. A typical example from the practice would be when a driver drives behind a truck and intends to overtake. In view of the traffic in opposite direction, he reduces the position of the accelerator pedal so that the automatic transmission upshifts, for ex., from the fourth to the fifth gear. During the upshift the driver detects that the opposite road is now free and again actuates the accelerator pedal. According to the prior art in this case, the upshift is first entirely carried out. Thereafter usually comes a blocking time and only then is begun the downshift from the fifth to the fourth gear. The blocking time is thus needed, since it must be ensured that the disengaging clutch be completely drained in the upshift. If this is not the case, the rapid filling of the now engaging clutch during the downshift makes itself noticeable in the form of a jolt. FIG. 4 consists of parts FIGS. 4A to 4D. They respectively show in the course of time:

FIG. 4A the shift command;

FIG. 4B the speed curve of the transmission input speed nT;

FIG. 4C the pressure curve of a first clutch; and

FIG. 4D the pressure curve of a second clutch.

Two examples are again shown in FIG. 4B. The speed curve with the reference numeral 40 corresponds here to a solution according to the prior art. To this speed curve belongs, with the reference numeral 38, the issuance of the shift command in FIG. 4A, the pressure curve of the first clutch according to reference numeral 42 and the pressure curve of the second clutch in FIG. 4D, with reference numeral 44. The second example in FIG. 4B, with reference numeral 41, shows a speed curve nT according to the invention. To said speed curve belongs in FIG. 4A, reference numeral 39, the shift command, in FIG. 4C the pressure curve of the first clutch, with reference numeral 43, and the pressure curve of the second clutch in FIG. 4D, with reference numeral 45. At the moment t1 is issued a shift command to upshift. The first clutch is simultaneously charged with the rapid filling pressure, pressure level p4, for the time interval t1 to t2. In the time interval t2 to t3, the clutch is then charged with filling pressure, pressure level p6. Thereafter follows for the time interval t3 to t6 a pressure increase according to straightening function. The terminal point is here the pressure level p3. Also at the moment t1, the pressure level of the second clutch is reduced from the value p7 to pressure level p8. Said pressure level is maintained up to the moment t4. Since in the time interval t3 to t5, the first clutch begins to take over the load from the second clutch, the second clutch can be disengaged at the moment t4. As consequence of the load assumption, the transmission input speed nT begins to change from the synchronization point nT(1) in direction to the new synchronization point nT(2). At the moment t6, the speed value nT(2) is reached, the upshift is thus terminated. Thereafter the pressure level of the first clutch is raised to the pressure level p1. If during the upshift, time interval t1 to t6, the driver actuates the accelerator pedal and wishes a downshift, then, according to the prior art, a blocking time extends first from the time interval t6 to t7. Not until the moment t7 is given the shift command for downshift, reference numeral 38 in FIG. 4A. Thereby the pressure level of the first clutch is reduced from p1 to p2. This pressure level maintained for the hold time, time interval t7 to t10. At the moment t10, the pressure level of the first clutch is reduced from p2 to p5. Thereby the curve of the transmission input speed nT changes in direction to a new synchronous speed point nT(1). Also at moment t10, the second clutch is loaded with the rapid filling pressure, pressure level p10, followed by filling pressure with the pressure level p1. At the moment t12, the synchronous speed value nT(1) is reached. At the synchronization point, the second clutch takes over the load from the first clutch. The first clutch can thus be reduced from the pressure level p5 to zero.

SECOND EXAMPLE

The method, according to the invention, develops identically as above described up to the moment t6. But at the moment t4, a time step is started with the disengagement of the second clutch. This time step extends up to a maximum end value tMAX, for ex., 2 minutes. With each time value is here associated a reduction time by which the rapid filling time is reduced. Thus results, for ex., in a time value of 100 msec a reduction time of −50 msec, or in a time value of 200 msec a reduction time of zero. Between said values is linearly interpolated. One other variant for calculating the rapid filling time can be carried out as follows: With each time value of the time step a rapid filling time is associated. Said rapid filling time is added to a basic rapid filling time; for ex., the basic rapid filling time can amount to 20 msec. When 60 msec result from the time step, the final rapid filling time is thus calculated to be 80 msec. At the moment t6 is issued, the repeated shift command for the downshift, reference numeral 39 in FIG. 4A. The effect of this is that the pressure level of the first clutch is reduced to the pressure level p5. Thus, the hold time was calculated as zero in this case. Also at the same time, the second clutch is filled with rapid filling pressure, pressure level p10. The time interval for the rapid filling, here t6 to t6A, is function of the values of the time step. This means in the practice that lesser values of the time step result in a short rapid filling time. In the extreme case, the rapid filing time can also be zero when it is specifically detected on the basis of the time step that the disengaging clutch still has not been drained. In the time interval t6 to t9, the second clutch is loaded with filling pressure p11. At the moment t9, the synchronous speed value nT(1) has been reached and the pressure level of the second clutch is raised to the value p9 so that it can reliably take over the load from the first clutch. Also at the moment t9, the first clutch, reference numeral 43, is reduced to zero. At the moment t12, the shift terminates, that is, the pressure level of the second clutch is reduced to the pressure level beyond the shift. As down in FIG. 4B, when using the method according to the invention, a time advantage Δt, time interval t9 to t12, results in comparison with the method according to the prior art, reference numeral 40. In other words: After an upshift the downshift is immediately performed without time offset. When overtaking, a very short time passes between the driver's wish and the actual acceleration, the spontaneity of the transmission being thus increased.

What is claimed is:

1. A method for increasing the spontaneity of an electro-hydraulically controlled automatic transmission (2) in which a shift from a first reduction step to a second reduction step in direction to a downshift is effected by a first clutch opening and a second clutch closing, an electronic transmission control (5) which controls, via electromagnetic elements, operating pressure curve of the first and second clutch, wherein with the issuance of a shift command the pressure level of the first clutch is reduced from a first pressure level (p1) to a second pressure level (p2), said second pressure level (p2) being maintained during a hold time (tHALT) wherein the hold time (tHALT) is a function of a rotational speed differential (d_nT) of a transmission input speed (nT) and hydraulic fluid temperature (Θ) (tHALT=f(d_nT, Θ), with the expiration of said hold time (tHALT=zero), the pressure level of said first clutch is reduced to a third pressure level (p3) for a recovery time (tRECOV), said third pressure level (p3) determining here the transmission input speed (nT) and with the expiration of said recovery time (tRECOV=zero), the pressure level of said first clutch is reduced to zero.

2. The method according to claim 1, wherein said hold time becomes approximately zero where a high rotational speed differential (d_nT) results from said transmission input speed (nT).

3. The method according to claim 2, wherein said rotational speed differential (d_nT) is calculated from the value of transmission input speed at the beginning of a shift (nT (1)) in a first reduction step and from the value of transmission input speed at the synchronization point of a second reduction step (nT (2)) whereby the equation: d_nT=nT(2)−nT(1) applies.

4. The method according to claim 1, wherein double shifts are sequentially carried out in the form of a first and a second shift and the second shift is a downshift effected according to claim 1.

5. The method according to claim 4, wherein in the double shift, the first shift of which is a downshift from a first to a second reduction step, with the disengagement of said first clutch a time step (tR) is started which extends up to a maximum time (tMAX), a reduction time being associated with each value of said time step (tR).

6. The method according to claim 5, wherein a rapid filling time (tSF) of said first engaging clutch in the downshift is changed according to the reduction time.

7. The method according to claim 6, wherein the rapid filling time changes in the sense that a lesser value of the time step (tR) causes a short rapid filling time (tSF).

8. The method according to claim 1, wherein said hold time (tHALT) is calculated as zero (tHALT=0) when the rotational speed differential (d_nT) of the transmission input speed (nT) exceeds (d_nT>GW) a limit value (GW).

9. A method for increasing the spontaneity of an electrohydraulically controlled automatic transmission (2) comprising the steps of:

downshifting from a shift from a first reduction step to a second reduction step, the downshift is effected by a first clutch opening and a second clutch closing;

controlling an operating pressure level of the first and second clutch via electromagnetic elements of an electronic transmission control (5);

issuing a shift command wherein the pressure level of the first clutch is reduced from a first pressure level (p1) to a second pressure level (p2);

maintaining said second pressure level (p2) during a hold time (tHALT) wherein the hold time (tHALT) is a function of a rotational speed differential (d_nT) of a transmission input speed (nT) and hydraulic fluid temperature (Θ) (tHALT=f(d_nT, Θ);

reducing the pressure level of said first clutch, upon expiration of said hold time (tHALT=zero), to a third pressure level (p3) for a recovery time (tRECOV);

determining the transmission input speed (nT), and with the expiration of said recovery time (tRECOV=zero), reducing the pressure level of said first clutch to zero;

sequentially carrying out the double shift comprising a first and a second shift, wherein one of the first and second shift is the downshift from the first to the second reduction step, and upon the disengagement of said first clutch a time step (tR) is started which extends up to a maximum time (tMAX), a reduction time being associated with each value of said time step (tR); and changing a rapid filling time (tSF) of said first engaging clutch in the downshift according to the reduction time.

10. A method for increasing the spontaneity of an electrohydraulically controlled automatic transmission (2) comprising the steps of:

downshifting from a shift from a first reduction step to a second reduction step, the downshift is effected by a first clutch opening and a second clutch closing;

controlling an operating pressure level of the first and second clutch via electromagnetic elements of an electronic transmission control (5);

issuing a shift command wherein the pressure level of the first clutch is reduced from a first pressure level (p1) to a second pressure level (p2);

maintaining said second pressure level (p2) during a hold time (tHALT) wherein the hold time (tHALT) is a function of a rotational speed differential (d_nT) of a transmission input speed (nT) and hydraulic fluid temperature (Θ) (tHALT=f(d_nT, Θ);

reducing the pressure level of said first clutch, upon expiration of said hold time (tHALT=zero), to a third pressure level (p3) for a recovery time (tRECOV);

determining the transmission input speed (nT), and with the expiration of said recovery time (tRECOV=zero), reducing the pressure level of said first clutch to zero;

calculating said hold time (tHALT) as zero (tHALT=0) when the rotational speed differential (d_nT) of the transmission input speed (nT) exceeds (d_nT>GW) a limit value (GW).

* * * * *